(12) United States Patent
Heid et al.

(10) Patent No.: US 8,464,385 B2
(45) Date of Patent: Jun. 18, 2013

(54) VEHICLE WASHING INSTALLATION

(71) Applicant: Alfred Karcher GmbH & Co. KG, Winnenden (DE)

(72) Inventors: Claus Heid, Stuttgart (DE); Andre Speckmaier, Wuestenrot (DE); Yann Veitz, Vaihingen/Enz (DE); Ingo Feistkorn, Friedelsheim (DE); Bernd Knisel, Leonberg (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 0 days.

(21) Appl. No.: 13/661,520

(22) Filed: Oct. 26, 2012

(65) Prior Publication Data
US 2013/0047355 A1 Feb. 28, 2013

Related U.S. Application Data

(63) Continuation of application No. PCT/EP2010/055858, filed on Apr. 29, 2010.

(51) Int. Cl.
*B60S 3/06* (2006.01)

(52) U.S. Cl.
USPC ............ 15/53.3; 15/53.2; 15/97.3; 15/DIG. 2

(58) Field of Classification Search
USPC ................... 15/53.1, 53.2, 53.3, 97.3, DIG. 2
See application file for complete search history.

(56) References Cited

U.S. PATENT DOCUMENTS

| 4,495,667 A | 1/1985 | Roncaglione et al. |
| 4,689,749 A * | 8/1987 | Glogowski .................... 700/230 |
| 2007/0074357 A1* | 4/2007 | Reed .................................. 15/3 |

FOREIGN PATENT DOCUMENTS

| AU | 18659/70 | 2/1972 |
| DE | 10 2006 027 308 A1 | 12/2007 |
| EP | 1 924 471 B1 | 5/2008 |

* cited by examiner

*Primary Examiner* — Randall Chin
(74) *Attorney, Agent, or Firm* — Womble Carlyle Sandridge & Rice, LLP

(57) ABSTRACT

A vehicle washing installation is provided having a first and a second support on which at least one treatment tool is mounted in a height-adjustable manner by means of a first and a second carrying means, and having a carrying means drive device from which the carrying means extend to the treatment tool via deflection elements situated on the top of the supports, one carrying means extending above the treatment tool from at least one deflection element situated on the first support to at least one deflection element situated on the second support. To improve the vehicle washing installation in such a way that it may be easily adapted to the height of a washing bay, it is proposed that the deflection elements are mounted on intermediate parts which are fixable to the supports at different vertical positions.

11 Claims, 5 Drawing Sheets

VEHICLE WASHING INSTALLATION

CROSS-REFERENCE TO RELATED APPLICATIONS

This application is a continuation of international application number PCT/EP2010/055858, filed on Apr. 29, 2010, which is incorporated herein by reference in its entirety and for all purposes.

BACKGROUND OF THE INVENTION

The invention relates to a vehicle washing installation having a first and a second support on which at least one treatment tool is mounted in a height-adjustable manner by means of a first and a second carrying means, and having a carrying means drive device from which the carrying means extend to the treatment tool via deflection elements situated on the top of the supports, one carrying means extending above the treatment tool from at least one deflection element situated on the first support to at least one deflection element situated on the second support.

These types of vehicle washing installations, with the aid of which a vehicle can be cleaned, are known from DE 10 2006 027 308 A1. The vehicle washing installation includes at least one height-adjustable treatment tool, for example a cleaning brush, a nozzle bar, a dryer, or the like. The treatment tool is mounted on two carrying means which can be moved by a carrying means drive device in order to raise and lower the treatment tool. The carrying means are deflected on deflection elements situated on the upper ends of the supports. For example, the carrying means may in each case be fixed to an end face of the treatment tool facing a support, and, starting from the end face, may extend vertically upward until reaching a deflection element, at which they are deflected in the direction of the carrying means drive device. One of the carrying means extends above the treatment tool between the two supports in order to be able to interact with the carrying means drive device.

These types of vehicle washing installations are customarily situated in a washing bay, and their dimensions, in particular height, must therefore be adapted to the dimensions of the washing bay. In particular the height of the vehicle washing installation, and thus the maximum height which the at least one height-adjustable treatment tool may have, is adapted to the height of the washing bay in such a way that optimal use is made of the height of the washing bay, and vehicles of the greatest possible height may be cleaned.

The vehicle washing installation is usually adapted to the predetermined height of the washing bay by using supports of the appropriate height. This has the disadvantage that the manufacturer of the vehicle washing installation must keep a multiplicity of supports of different heights on hand.

It is an object of the present invention to improve a vehicle washing installation of the type mentioned at the outset in such a way that it may be easily adapted to the height of a washing bay.

SUMMARY OF THE INVENTION

For a vehicle washing installation of the generic kind, this object is achieved according to the invention in that the deflection elements are mounted on intermediate parts which are fixable to the supports at different vertical positions.

The deflection elements may be easily fixed at different vertical positions by means of the intermediate parts used according to the invention. The deflection elements form the highest components of the vehicle washing installation according to the invention. The intermediate parts on which the deflection elements are mounted form vertical extensions of the supports and are variable in their effective length. Different heights for the vehicle washing installation may thus be easily achieved without having to use different supports for this. By means of the intermediate parts, the deflection elements, to the extent allowed by the washing bay, may be fixed to the supports at maximum height, or the deflection elements may be fixed to the supports at a slightly lower height if this is required by the washing bay. The deflection elements are fixed at the desired height by means of the intermediate parts. The vehicle washing installation may thus be easily adapted to the height of the particular washing bay.

In an advantageous embodiment of the invention, particularly simple assembly is achieved in that the intermediate parts are fixable to the supports at predeterminable positions. The positions may be defined by predetermined connecting elements, for example, so that during assembly of the vehicle washing installation, the connecting elements which are optimal for the particular height may be used for connecting the intermediate parts to the supports.

It may be provided that the intermediate parts are releasably connectable to the supports. In particular, a screw connection may be used. In this regard, it may be provided that the intermediate parts have a series of holes, extending in the vertical direction, through which the connecting screws may be passed in order to screw the intermediate parts to the supports. During assembly of the vehicle washing installation, the holes which are suitable for an optimal height may then be used for screw connection of the intermediate parts.

In a preferred embodiment of the vehicle washing installation according to the invention, the supports are hollow, and the intermediate parts engage into the supports at the top. The intermediate parts thus form a type of extension piece for the supports, and protrude as far from the top of the supports as is determined by the particular washing bay. The deflection elements are situated at the free ends of the intermediate parts facing away from the supports.

The deflection elements are advantageously formed as freely rotatable deflection rollers.

It may be provided that only a single deflection element is situated on each intermediate part. However, with regard to guiding the carrying means, it is advantageous if several deflection elements are mounted on at least one intermediate part. Thus, for example, it may be provided that at least two deflection rollers are mounted in a freely rotatable manner on each intermediate part.

It is advantageous if the intermediate parts in each case carry at their free end a bearing part on which at least one deflection roller is rotatably mounted.

The bearing parts may, for example, be U-shaped, and may have two legs that are aligned parallel to one another as well as a web which connects the legs to one another, the deflection rollers being rotatably mounted on the legs.

At least two deflection rollers are preferably rotatably mounted on at least one bearing part.

In many cases, the at least one treatment tool which is mounted in a height-adjustable manner is covered by a splash guard. The splash guard ensures that water spray cannot easily reach the ceiling of the washing bay from the at least one treatment tool.

It is advantageous if the at least one splash guard covering the height-adjustable treatment element is mounted on the intermediate parts. In such a configuration of the vehicle washing installation according to the invention, the intermediate parts support not only the deflection elements, but also the splash guard. The position of the splash guard, similarly as for the position of the deflection elements, may thus be easily adapted to the predetermined height of a washing bay by fixing the intermediate parts to the supports in an appropriate position.

In a preferred embodiment of the invention, the splash guard has a splash guard frame which is fixed to the intermediate parts, and on which a splash guard awning is mounted. The splash guard frame may, for example, have two circular arc-shaped side parts, each mounted on an intermediate part, and a plurality of transverse parts which connect the two side parts to one another and are aligned parallel to the longitudinal axis of the height-adjustable treatment tool.

It is particularly advantageous if the splash guard frame is fixed to the supports of the vehicle washing installation not only via the intermediate parts, but if additional brackets are used which are oriented transversely with respect to the longitudinal axis of the height-adjustable treatment tool and transversely with respect to the longitudinal axis of the supports.

The carrying means drive device which is coupled to the at least one height-adjustable treatment tool via the carrying means may include a drive sheave, for example, which may be set in rotation by a motor for adjusting the height of the at least one treatment tool, and over which the two carrying means are guided, and in addition the carrying means drive device may have a counterweight from which the two carrying means extend over the drive sheave and the deflection elements until reaching the height-adjustable treatment tool.

Alternatively, it may be provided that the carrying means drive device has a winding device having a winding drum onto which the carrying means can be wound. The winding drum may be set in rotation by a motor in order to wind or unwind the carrying means for adjusting the height of the at least one treatment tool.

The carrying means are preferably formed as a belt.

The winding device is advantageously situated beneath the deflection elements at an upper end region of a support.

The at least one height-adjustable treatment tool may be provided, for example, in the form of a roof brush which is mounted on carriages so as to be rotatable about a rotational axis, the carriages being mounted on the supports in a height-adjustable manner and in each case a carrying means being fixed to the carriages. The carriages may be provided in the manner of a trolley which is displaceably mounted on a guide rail.

The following description of a preferred embodiment of the invention serves for explanation in greater detail in conjunction with the drawings.

DETAILED DESCRIPTION OF THE INVENTION

Figure 4:
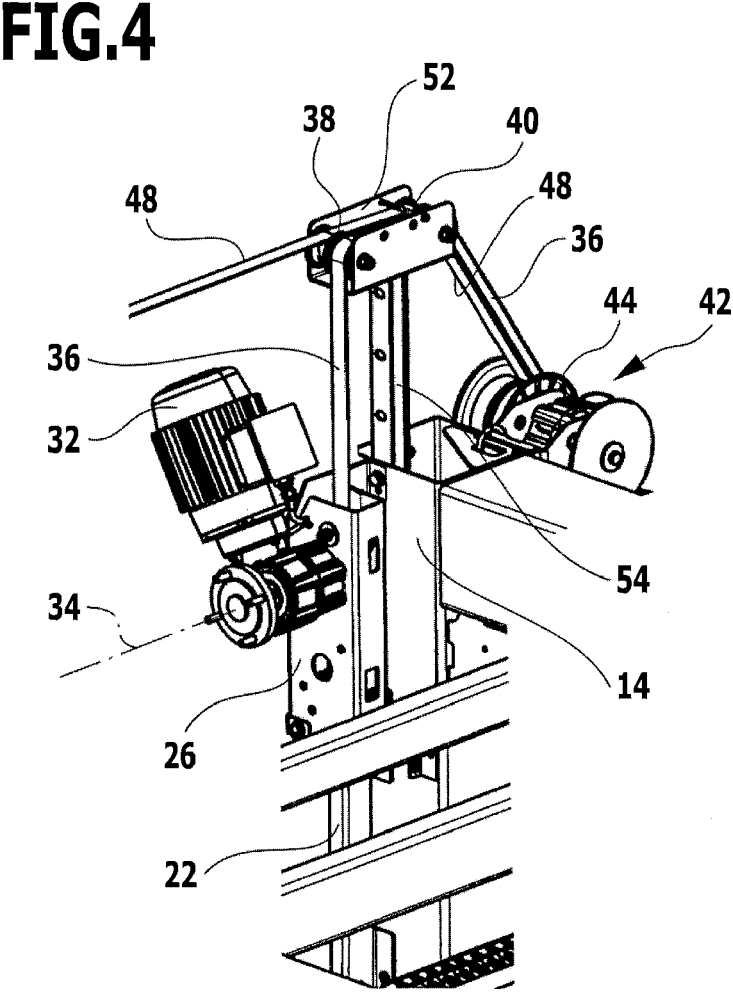
FIG. 4 shows a perspective partial view of the upper end region of the support from FIG. 2 in an oblique view from the rear, having deflection elements fixed in a top position, with the roof brush removed.
Figure 5:
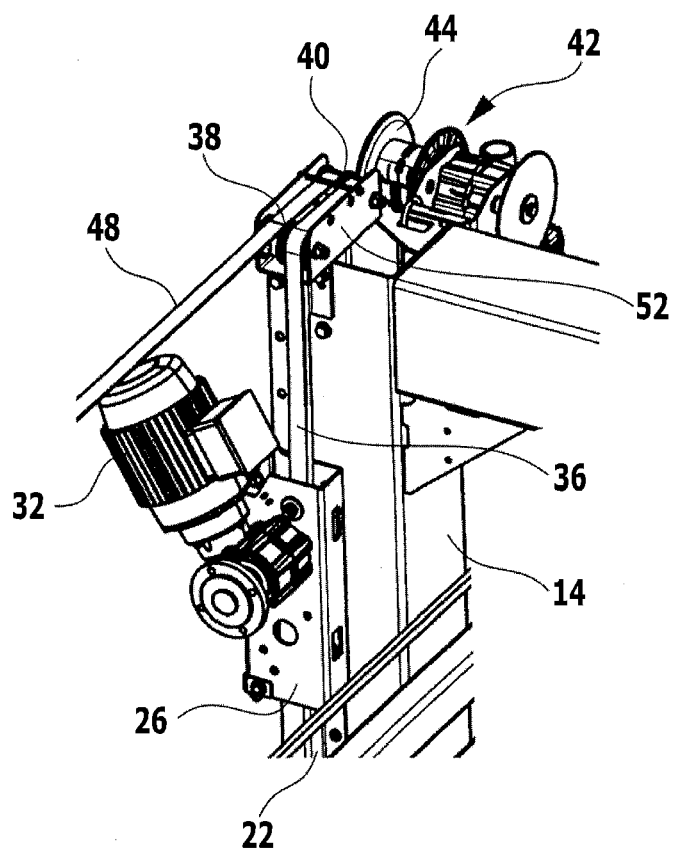
FIG. 5 shows a perspective partial view of the upper end region of the support corresponding to FIG. 4, with the deflection elements fixed in a bottom position.

The drawing schematically illustrates a vehicle washing installation 10 according to the invention, having a wash gantry 12 which has a first vertical support 14 and a second vertical support 16. On their mutually facing inner sides 18 and 20, the supports 14, 16 each carry a guide rail, 22 and 24, respectively. A support mechanism in the form of a carriage 26 or 28 is displaceably mounted on the guide rail 22, 24, respectively. A height-adjustable treatment tool in the form of a roof brush 30 is rotatably mounted on the carriages 26, 28. The roof brush can be set in rotation about its horizontally oriented rotational axis 34 by a brush motor 32. The brush motor 32 is mounted on the carriage 26, and together with the roof brush 30 can be adjusted in height. This is apparent in particular in FIGS. 4 and 5, in which the roof brush 30 is not illustrated for the sake of clarity.

The first carriage 26 is mounted on a first carrying means in the form of a first support belt 36 which, starting from the first carriage 26, initially extends upwardly in the vertical direction, and, above the first support 14, is deflected on deflection elements in the form of a first deflection roller 38 and a second deflection roller 40 in the direction of a carrying means drive device, which, in the form of a winding device 42, is situated at the upper end region of the vertical support 14, on its outer side facing away from the support 16. The winding device 42 has a winding drum 44 which can be set in rotation by a drive motor 46. The first support belt 36 can be wound onto the winding drum 44 to raise the first carriage 26, and the first support belt 36 can be unwound from the winding drum 44 to lower the first carriage 26.

The second carriage 28 is mounted on a second carrying means in the form of a second support belt 48. Starting from the second carriage 28, the second support belt 48 initially extends upwardly in the vertical direction, and, above the second support 16, is deflected in the direction of the support 14 on a deflection element in the form of a third deflection roller 50. The second support belt 48 then extends above the roof brush 30 to the first deflection roller 38 and to the second deflection roller 40 in order to be subsequently wound onto the winding drum 44. The second carriage 28 can thus also be adjusted in height by winding and unwinding the second support belt 48 by means of the winding drum 44.

Displacing the carriages 26 and 28 via the two support belts 36, 48 by means of the winding drum 44 allows the roof brush 30 to be raised and lowered.

The first deflection roller 38 and the second deflection roller 40 are freely rotatably mounted on a first bearing part 52 which is mounted at the free end of a first intermediate part 54. The first intermediate part 54 engages into the top of the first support 14 which is formed as a hollow profile, and can be screwed to the first support 14 in different positions by means of connecting screws 56. In FIGS. 1 to 4, the first intermediate part 54 is illustrated in an upper position in which it protrudes as far as possible from the first support 14, and in FIG. 5 the first intermediate part 54 is illustrated in a lower position in which it is engaged as far as possible into the first support 14. The position assumed by the first deflection roller 38 and the second deflection roller 40 may thus be easily changed by means of the first intermediate part 54 without having to change the first support 14.

The third deflection roller 50 is freely rotatably mounted on a second bearing part 58 which is mounted at the free end of a second intermediate part 60. The second intermediate part 60 is formed similarly to the first intermediate part 54, and engages into the top side of the second support 16 which is formed as a hollow profile, and, in a similar manner as for the first intermediate part 54, may be fixed to the second support 16 in different vertical positions in order to easily change the position of the second deflection roller 40 without having to change the second support 16.

Figure 1:
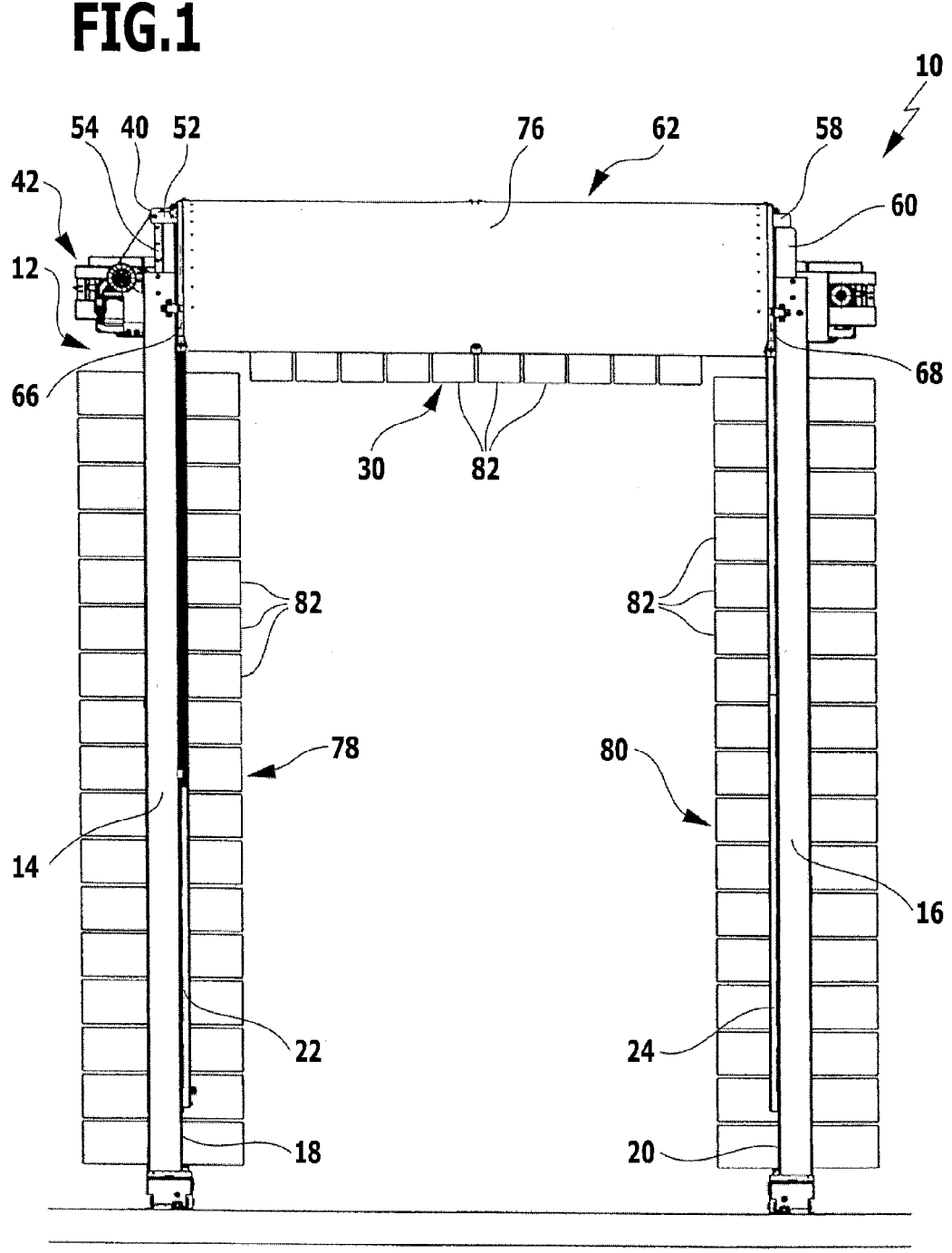
FIG. 1 shows a schematic front view of a vehicle washing installation according to the invention having two vertically oriented side brushes and a horizontal roof brush which is covered by a splash guard.
Figure 2:
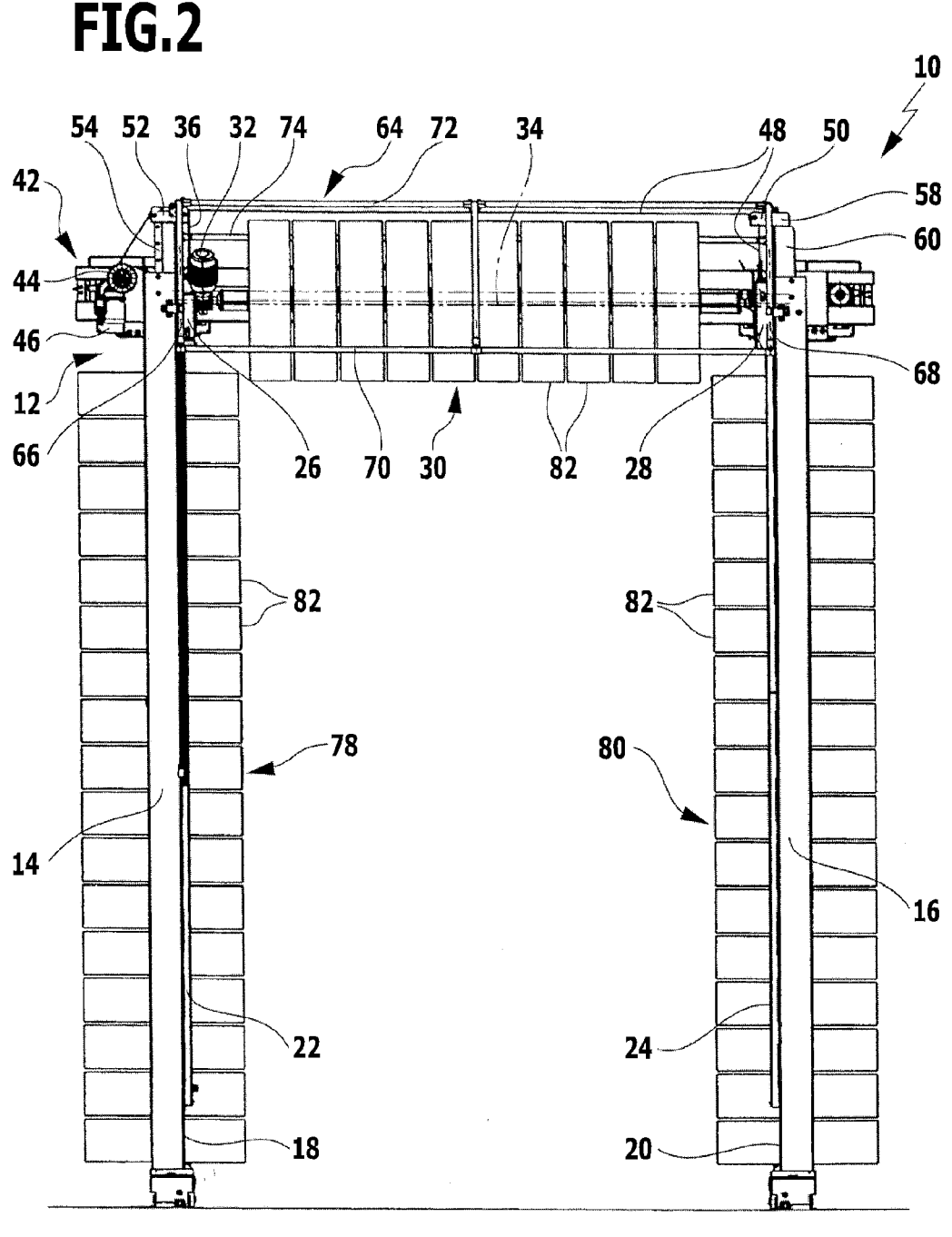
FIG. 2 shows a front view of the vehicle washing installation from FIG. 1, a splash guard awning of the splash guard having been removed.
Figure 3:
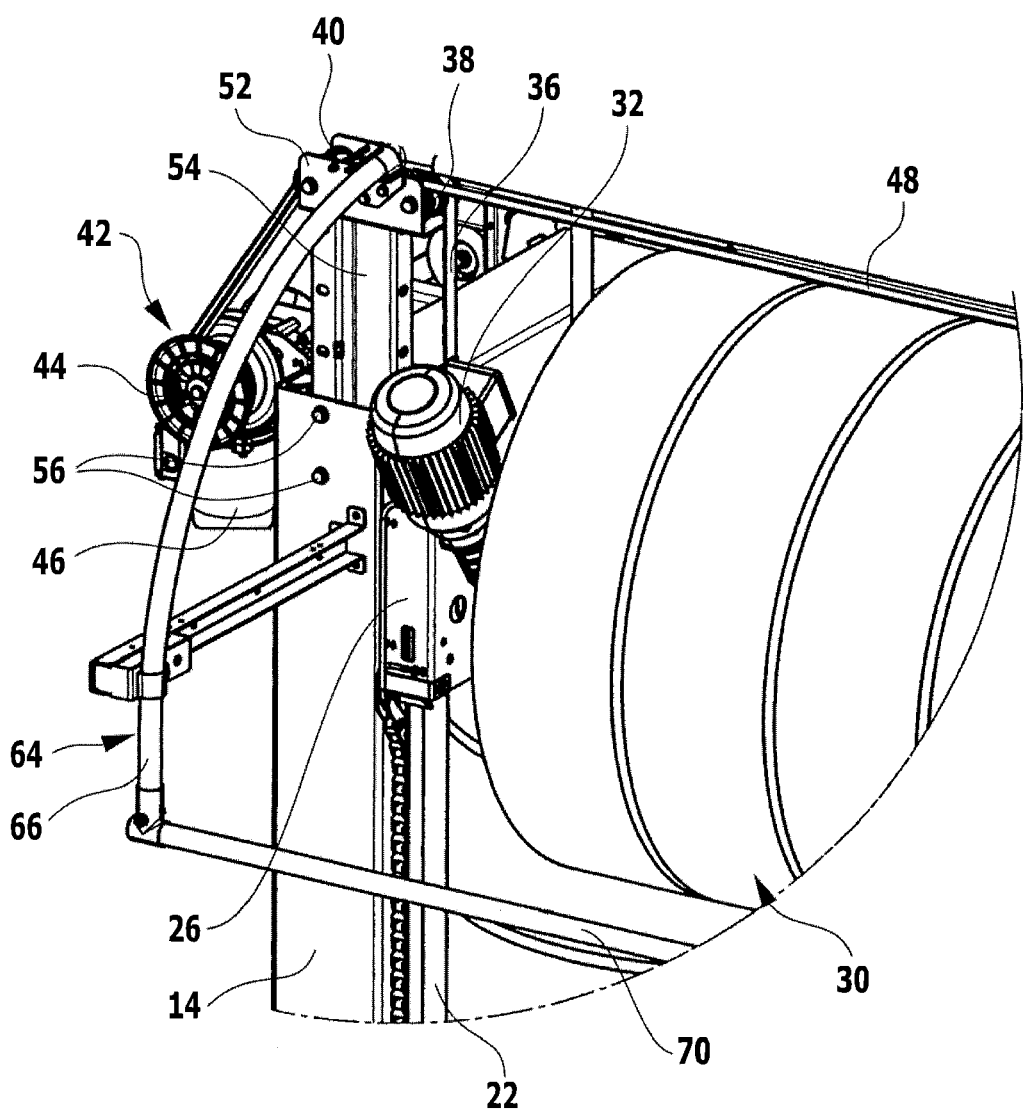
FIG. 3 shows a perspective partial view of an upper end region of a support of the vehicle washing installation from FIG. 2, in an oblique view from the front.

As is apparent in particular from FIGS. 1 and 2, the roof brush 30 is covered by a splash guard 62. The splash guard 62 includes a splash guard frame 64 having two circular arc-shaped side parts 66, 68 which are fixed to the first bearing part 52 and the second bearing part 58, respectively, and which are connected to one another via three linear transverse parts 70, 72, 74. A splash guard awning 76, illustrated in FIG. 1, is mounted on the splash guard frame 64. The splash guard awning 76 is not illustrated in the remaining figures for the sake of clarity.

Since the splash guard frame 64 is mounted on the bearing parts 52 and 58, its vertical position may be easily changed, together with the deflection rollers 38, 40, and 50, by fixing the intermediate parts 54, 60 to the supports 14, 16 in the particular desired position.

In addition to the roof brush 30, the vehicle washing installation 10 has vertically oriented side brushes 78, 80. The side brushes 78, 80, the same as the roof brush 30, are equipped with washing elements in the form of non-woven strips 82. Alternatively, the side brushes 78, 80 and the roof brush 30 could be equipped with bristles.

The side areas of a vehicle can be cleaned by means of the side brushes 78, 80, and the hood, the roof, and the trunk of a vehicle can be cleaned by means of the roof brush 30. For this purpose, the roof brush 30 may be adjusted in height, as explained above. The entire wash gantry 12 can be guided along a stationary vehicle. Alternatively, it may be provided that the wash gantry 12 is immovable, and instead the vehicle is moved along the wash gantry 12.

The vehicle washing installation 10 is customarily situated in a washing bay of a building. If allowed by the height of the washing bay, the intermediate parts 54 and 60 are screwed to the supports 14 and 16, respectively, in their topmost position illustrated in FIGS. 3 and 4, so that the deflection rollers 38, 40, and 50, as well as the splash guard frame 64, assume a topmost position, and the roof brush 30 may be raised to the height of the upper end of the supports 14, 16. However, if the washing bay has a lower height, the intermediate parts 54, 60 may assume a lower position by being engaged further into the supports 14 and 16, respectively. The deflection rollers 38, 40, and 50, as well as the splash guard frame 64, then assume a lower position, and the roof brush 30 may then only be raised to a lower height. The maximum height which the roof brush 30 may have may be determined by a limit switch which, for example, may be provided in the form of an inductive proximity switch and fixed to a support in different positions in adaptation to the position of the intermediate parts 54 and 60. When the carriage 26 reaches the limit switch, its switch position changes and the winding device 42 is switched off, so that the roof brush 30 cannot be raised further.

The vehicle washing installation 10 according to the invention allows a simple adaptation to the predetermined height of a washing bay without having to modify the vertical supports 14 and 16. To adjust the height of the vehicle washing installation 10, it is only necessary to adapt the vertical position of the intermediate parts 54 and 60 to the height of the washing bay.

The invention claimed is:

1. A vehicle washing installation having a first and a second support on which at least one treatment tool is mounted in a height-adjustable manner by means of a first and a second carrying means and having a carrying means drive device from which the carrying means extend to the treatment tool via deflection elements situated on the top of the supports, one carrying means extending from at least one deflection element situated on the first support to at least one deflection element situated on the second support, wherein the deflection elements are mounted on intermediate parts which are fixable to the supports at different vertical positions.

2. The vehicle washing installation according to claim 1, wherein the intermediate parts are fixable to the supports at predeterminable positions.

3. The vehicle washing installation according to claim 1, wherein the intermediate parts are releasably connectable to the supports.

4. The vehicle washing installation according to claim 1, wherein the supports are hollow, and the intermediate parts engage into the supports.

5. The vehicle washing installation according to claim 1, wherein the deflection elements are formed as freely rotatably mounted deflection rollers.

6. The vehicle washing installation according to claim 5, wherein the intermediate parts in each case carry at their free end a bearing part on which at least one deflection roller is rotatably mounted.

7. The vehicle washing installation according to claim 6, wherein at least two deflection rollers are rotatably mounted on at least one bearing part.

8. The vehicle washing installation according to claim 1, wherein a splash guard is mounted on the intermediate parts.

9. The vehicle washing installation according to claim 8, wherein the splash guard has a splash guard frame on which a splash guard awning is mounted.

10. The vehicle washing installation according to claim 1, wherein the carrying means drive device has a winding device having a winding drum onto which the carrying means can be wound.

11. The vehicle washing installation according to claim 10, wherein the winding device is situated beneath the deflection elements at an upper end region of a support.

* * * * *

UNITED STATES PATENT AND TRADEMARK OFFICE
CERTIFICATE OF CORRECTION

PATENT NO.      : 8,464,385 B2
APPLICATION NO. : 13/661520
DATED           : June 18, 2013
INVENTOR(S)     : Claus Heid et al.

It is certified that error appears in the above-identified patent and that said Letters Patent is hereby corrected as shown below:

On Title Page 1, item (71), the Applicant name appears as Alfred Karcher GmbH & Co. KG and it should appear as it does under the "Assignee" heading, with an umlaaut over the letter "a" as follows: Alfred Kärcher GmbH & Co. KG.

Signed and Sealed this
Fifteenth Day of July, 2014

Michelle K. Lee
*Deputy Director of the United States Patent and Trademark Office*